United States Patent [19]

Sutton

[11] 4,274,788
[45] Jun. 23, 1981

[54] VEHICLE MOUNTED CARRIAGE AND ELEVATING APPARATUS

[76] Inventor: Luther M. Sutton, P.O. Box 972, Pineville, La. 71360

[21] Appl. No.: 112,835

[22] Filed: Jan. 17, 1980

[51] Int. Cl.³ ............................ B60R 9/00; B60P 3/10; B60N 9/00
[52] U.S. Cl. ..................................... 414/462; 224/310; 414/538; 414/559; 414/786
[58] Field of Search .................... 224/310, 321, 282; 414/538, 462, 786, 559

[56] References Cited

U.S. PATENT DOCUMENTS

| | | | |
|---|---|---|---|
| 3,871,540 | 3/1975 | Jenkins | 414/462 |
| 3,872,989 | 3/1975 | Smithson et al. | 414/462 |
| 3,927,779 | 12/1975 | Johnson | 414/538 X |
| 3,972,433 | 8/1976 | Reed | 224/310 X |

Primary Examiner—Steven M. Pollard
Attorney, Agent, or Firm—Gerald G. Crutsinger; John F. Booth; Harry C. Post, III

[57] ABSTRACT

A vehicle mounted carriage and elevating apparatus comprising a support frame secured to the vehicle. A link frame is pivotally secured to the support frame and a post frame is pivotally secured to the vehicle. A carriage which is movably secured to the post frame and to the link frame. Actuating apparatus is secured between the support frame and the carriage and is adapted to move the carriage from a lower inclined position extending rearwardly of the vehicle to a substantially horizontal elevated position wherein the center of gravity of the carriage is positioned above the vehicle and between the wheels of the vehicle.

5 Claims, 7 Drawing Figures

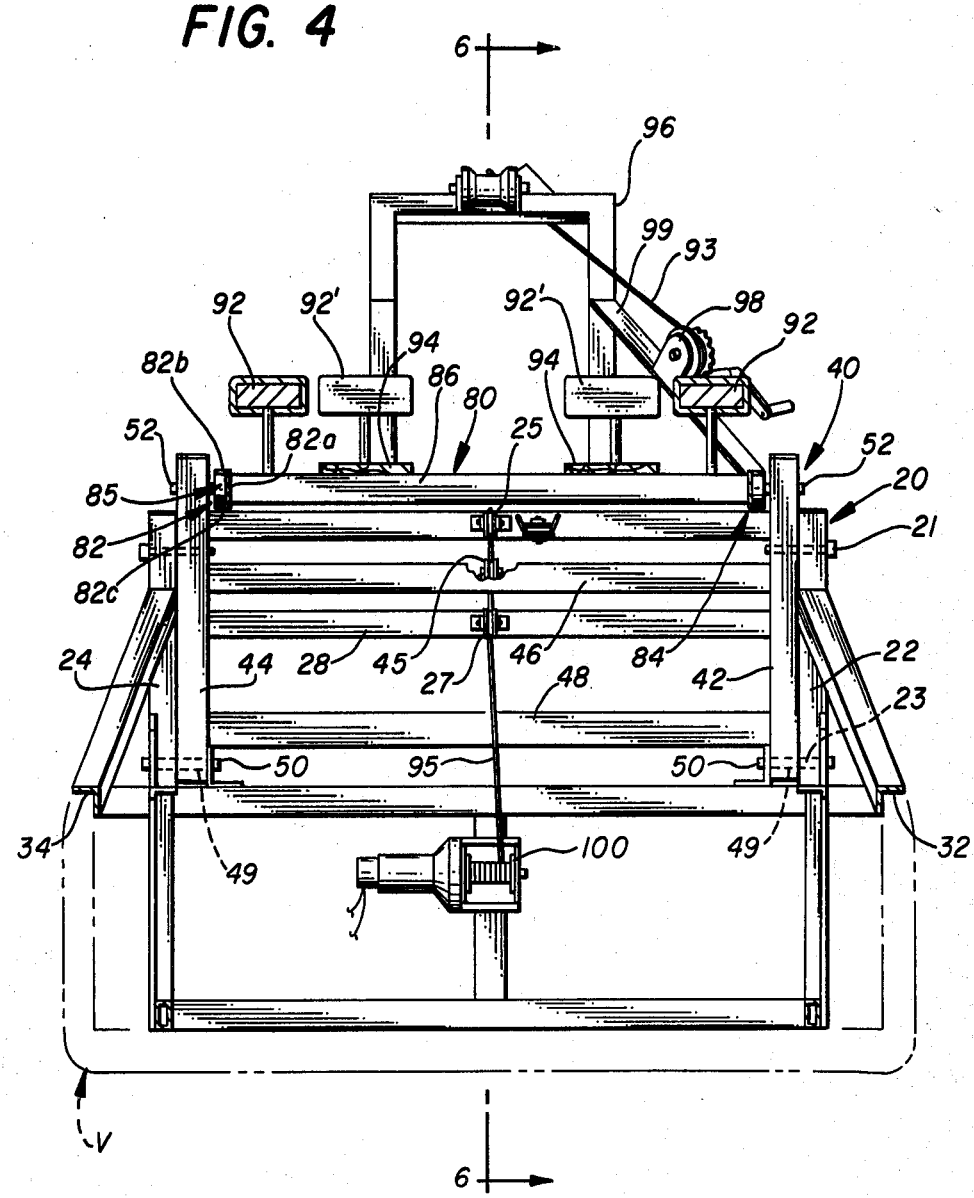

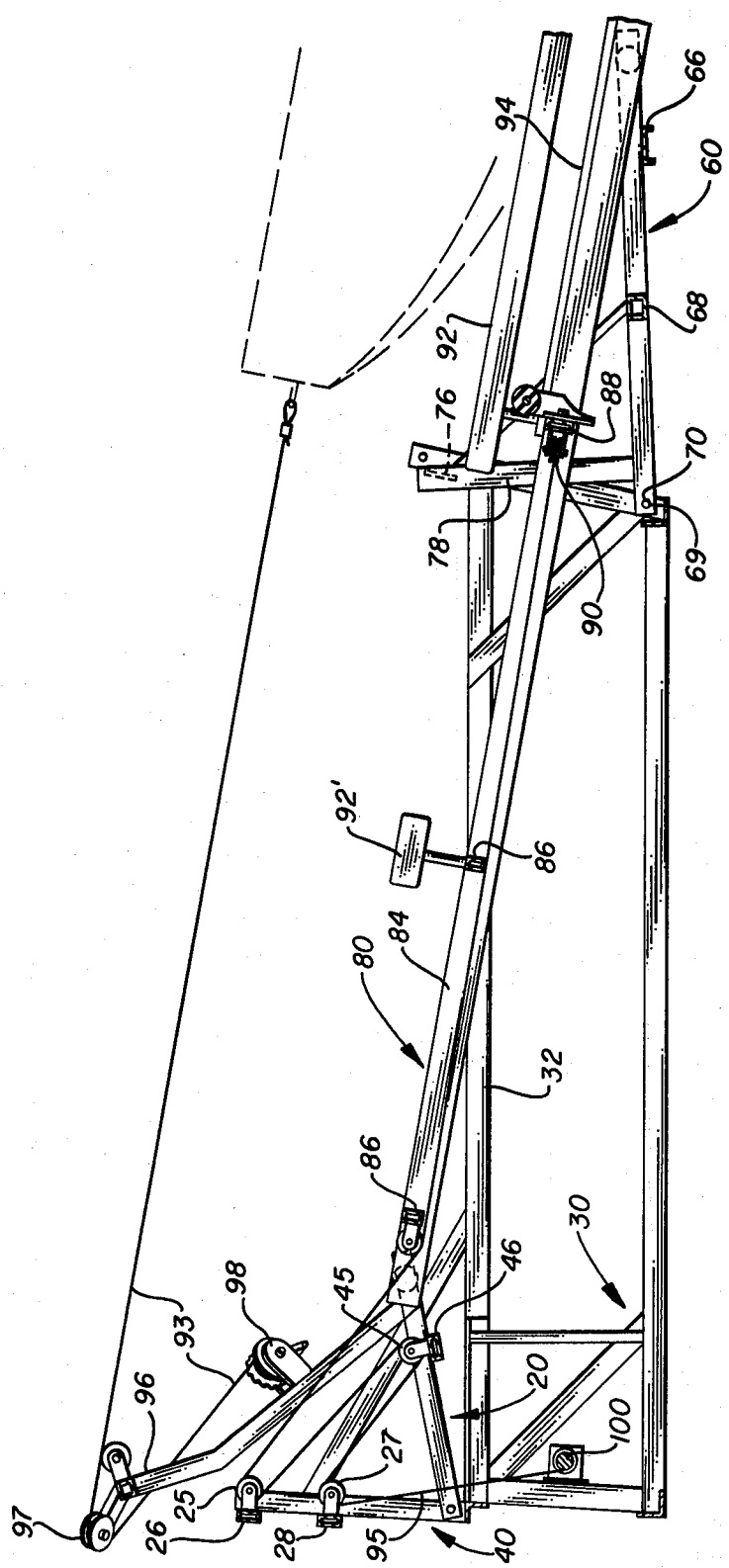

VEHICLE MOUNTED CARRIAGE AND ELEVATING APPARATUS

The carriage and elevating apparatus described herein is mounted on a pick-up truck or similar vehicle for launching and hauling recreational vehicles such as boats, dune buggys, snowmobiles, motorcycles or bicycles.

Sportsmen often encounter difficulty in delivering both a boat and a camper trailer to a recreation site. Two trips are generally required, one to deliver the camping trailer and a second to deliver and launch a boat mounted on a trailer.

Car top carriers heretofore devised are disclosed in the following United States patents: U.S. Pat. No. 2,479,035; U.S. Pat. No. 2,492,841; U.S. Pat. No. 3,170,583; U.S. Pat. No. 3,527,371; U.S. Pat. No. 3,720,358; and U.S. Pat. No. 3,927,779. Devices for loading boats and the like on pick-up trucks are disclosed in the following United States patents: U.S. Pat. No. 3,734,321; U.S. Pat. No. 3,894,643; and U.S. Pat. No. 3,972,433.

SUMMARY OF INVENTION

The vehicle mounted carriage and elevating apparatus generally comprises a carriage having channels extending along the opposite sides thereof for supporting a boat or other load to be carried, in combination with a lifting mechanism for moving the carriage from a lower inclined position extending rearwardly of the vehicle to a substantially horizontal elevated position above the vehicle. The elevating mechanism comprises a pair of spaced rear posts having rollers mounted on the upper end thereof which extends into channels in the carriage and a pair of spaced links having rollers mounted on the upper ends thereof which also extend into the channels adjacent opposite sides of the carriage.

A flexible line has a running end secured to a winch driven drum and a running end connected to the carriage. A pair of vertically spaced pulleys are secured to a support member between the front links and a third pulley is secured to the links, the bight portion of the line extending around the front side of the pair of pulleys and around the back side of the pulley secured to the links such that applying tension to the line for elevating the carriage moves the links from a horizontal position to a vertical position, thereby elevating the front end of the carriage. When the links reach a vertical position further movement is limited by a stop so that further tensioning of the line moves the carriage relative to the links and the post to a position wherein rollers on the rear post engage a stop in the track for pivoting the rear post from a substantially horizontal position to a vertical position thereby elevating the rear end of the carriage.

A primary object of the invention is to provide a vehicle mounted carriage and elevating apparatus for launching a boat wherein the boat is moved from a horizontal position above the vehicle to an inclined position extending rearwardly of the vehicle to permit launching and loading the boat.

Another object of the invention is to provide a vehicle mounted carriage and elevating apparatus particularly adapted to be actuated by a winch and cable wherein a pair of links pivotally mounted to a vehicle are pivoted to elevate the front end of the carriage when the cable becomes taut and to lower the front end of the carriage when the cable becomes slack to permit use of the winch for elevating the boat to a horizontal position while maintaining the center of gravity of the boat as low as possible for hauling.

Other and further objects of the invention will become apparent upon referring to the detailed description hereinafter following and to the drawings annexed hereto.

DESCRIPTION OF DRAWING

Drawings of a preferred embodiment of the vehicle mounted carriage and elevating apparatus are annexed hereto so that the invention may be better and more fully understood, in which:

FIG. 4 is an enlarged cross-sectional view of the invention shown in FIG. 3, taken along line 4—4 in the direction of the arrows;

FIG. 6 is an enlarged cross-sectional view of the invention shown in FIG. 4; and taken along line 6—6 in the direction of the arrows.

DESCRIPTION OF A PREFERRED EMBODIMENT

Figure 1:
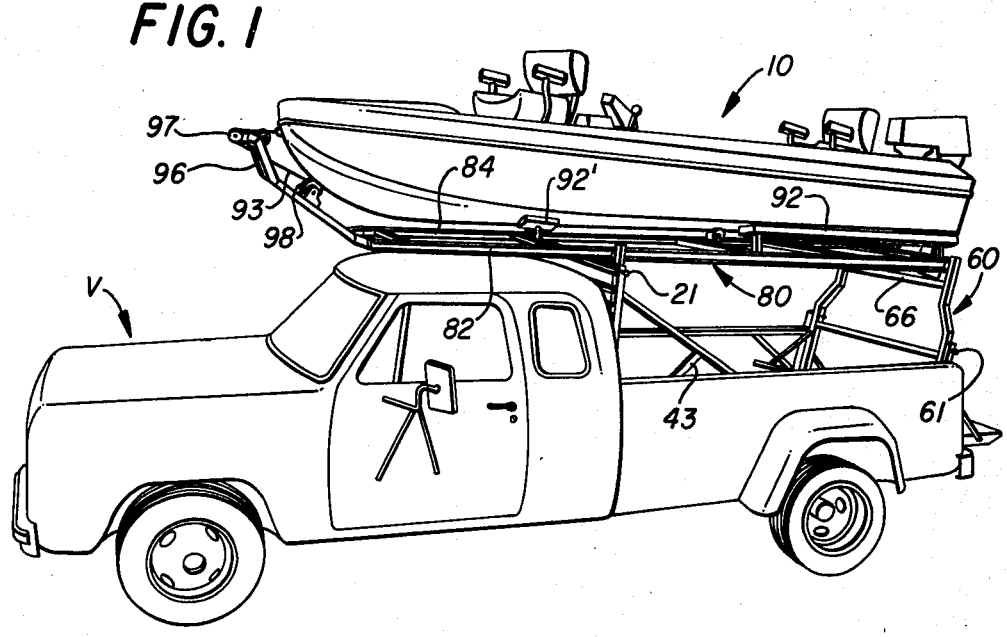
FIG. 1 is a perspective view of a preferred embodiment constructed according to the present invention mounted on a vehicle with the carriage shown in a first or elevated position.

Referring to FIG. 1 of the drawing the numeral 10 generally designates a vehicle mounted carriage and elevating apparatus comprising a support 20 mounted adjacent the front end of the bed of the pick-up, a front link frame 40 pivotally secured to the support 20, a rear post frame 60 pivotally mounted in the rear end of the bed, carriage 80 secured to the front link frame 40 and the rear post frame 60, and a line or cable 95 having a dead end secured to the carriage 80 and a running end secured to the drum 100 of a winch.

Referring to FIG. 4 of the drawing, the support frame 20 comprises a pair of vertically extending stanchions 22 and 24 bolted or otherwise detachably secured to the vehicle V, and a pair of spaced horizontally disposed brace members 26 and 28 having opposite ends welded or otherwise secured to upper portions of stanchions 22 and 24.

The lower portion 30 of support frame 20 is arranged to brace stanchions 22 and 24 and to facilitate removal of the carriage and elevating apparatus 10 from the bed of the pick-up truck V. The lower portion 30 of the frame may assume any suitable configuration but preferably includes spaced upper side rails 32 and spaced lower side rails 34 which extend along upper and lower edges of the side wall of the vehicle. The forward ends of side rails 32 and 34 are secured to stanchions 22 and 24 and rear ends of the side rails are secured to spaced uprights 36 adjacent opposite sides of the rear end of the vehicle.

The front link frame 40 comprises a pair of spaced link members 42 and 44 having a pair of horizontally disposed vertically spaced connector members 46 and 48 extending therebetween.

As will be hereinafter more fully explained, the upper connector member 46 is spaced at an elevation approximately half way between connector members 26 and 28. A pair of pulleys 25 and 27 are secured to brace members 26 and 28 and a pulley 45 is secured to connector member 46.

Pivot pins 50 extend through apertures 49 in the lower ends of each of the link members 42 and 44 and through apertures 23 formed in stanchions 22 and 24. As best illustrated in FIG. 4 several vertically spaced apertures 23 are formed in stanchions 22 and 24, pivot pin 50 being positionable in any selected aperture to adjust the elevation of carriage 80.

Axles 52 are secured to the upper ends of link members 42 and 44 and have rollers 54 mounted thereon.

The rear post frame 60 comprises a pair of spaced posts 62 and 64 welded or otherwise secured to opposite ends of horizontally disposed connector members 66 and 68.

A pivot pin 70 extends through aperture 69 formed in the lower end of each of the posts 62 and 64 and through apertures 38 formed in uprights 36 adjacent the rear end of the bed of the vehicle.

An axle 72 extends inwardly from upper ends of each of the posts 62 and 64 and have rollers 74 rotatably secured thereto.

Figure 5:
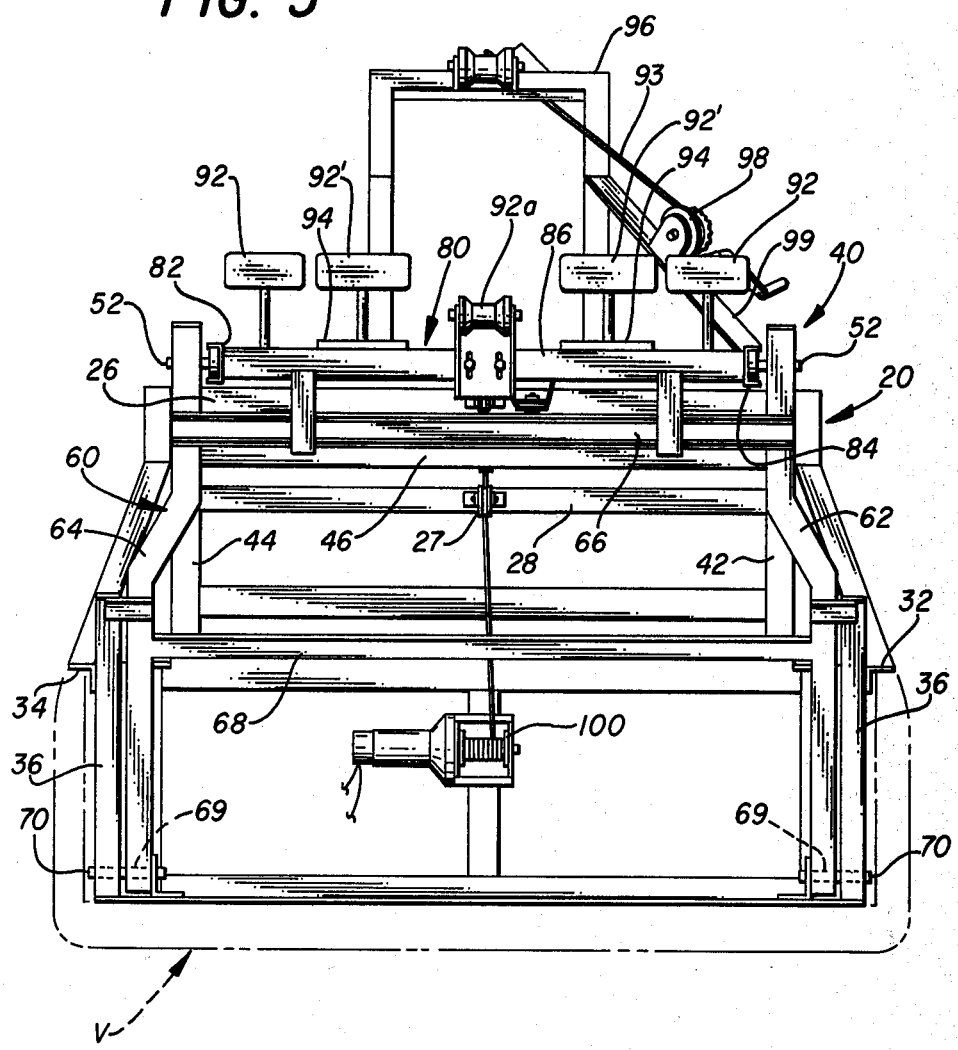
FIG. 5 is an enlarged view of the invention shown in FIG. 3, taken along line 5—5 in the direction of the arrows.

As best illustrated in FIG. 5 the carriage 80 comprises a pair of spaced channel members 82 and 84, each of the channel members having a vertically extending web portion 82a and horizontally extending upper and lower flanges 82b and 82c, respectively. The space between the upper flange 82 and lower flange 82c of channel members 82 and 84 defines a track 85 into which rollers 54 and 74 extend.

Rollers 54 and 74 are preferably tapered to fit into the space forming track 85.

Members 86 extend transversely across carriage 80 to form a strong rigid structure. A central beam 88 has opposite ends welded or otherwise secured to central portions of channel members 82 and 84. A pulley 90 and a stationary hook 91 are secured to a central portion of beam 88, as will be hereinafter more fully explained.

Spaced bolsters 92 are secured to carriage 80 for supporting the lower surface of a boat. If it is deemed expedient to do so, a boardwalk 94 may be provided to provide a surface upon which an operator may stand while preparing to launch or load a boat onto the carriage 80.

While the carriage 80 illustrated in the preferred embodiment is particularly adapted for carrying a boat, it should be appreciated that any suitable supporting structure may be mounted on the carriage 80 to accommodate motorcycles, pipe, tools or other load to be carried.

In the particular embodiment of the carriage 80 illustrated in the drawing, a bracket 96 extends upwardly from the front end of the carriage and has a pulley 97 mounted thereon. A winch 98 is mounted on an angle brace 99 secured between bracket 96 and one of the cross members 86. Winch 86, in the illustrated embodiment, is equipped with a crank. However, pulley 97 and winch 98 may be replaced with an electric motor-winch if so desired.

The running end of cable 93 is secured to the drum of winch 98 while the dead end is equipped with a hook (not shown) connectable to the bow of a boat. The central portion of line 93 extends around pulley 97 for pulling the boat in a direction parallel to the central axis of carriage 80.

A winch driven drum 100 is secured to the lower portion 30 of the support frame 20 for controlling tension in line 95.

OPERATION

Figure 2:
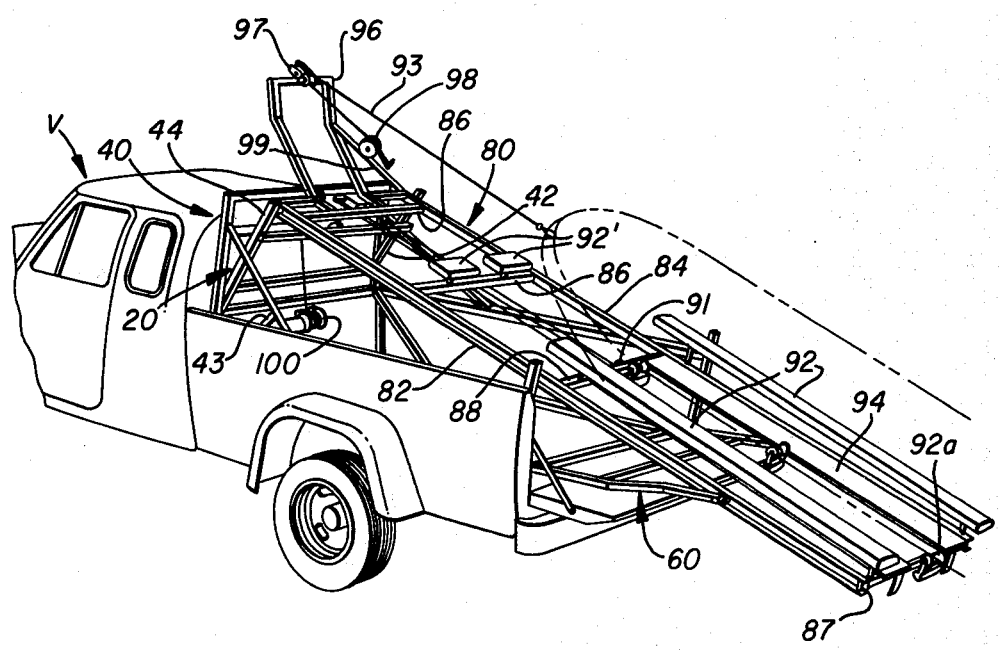
FIG. 2 is another perspective view of the embodiment shown in FIG. 1 with the carriage shown in a second or inclined position.
Figure 3:
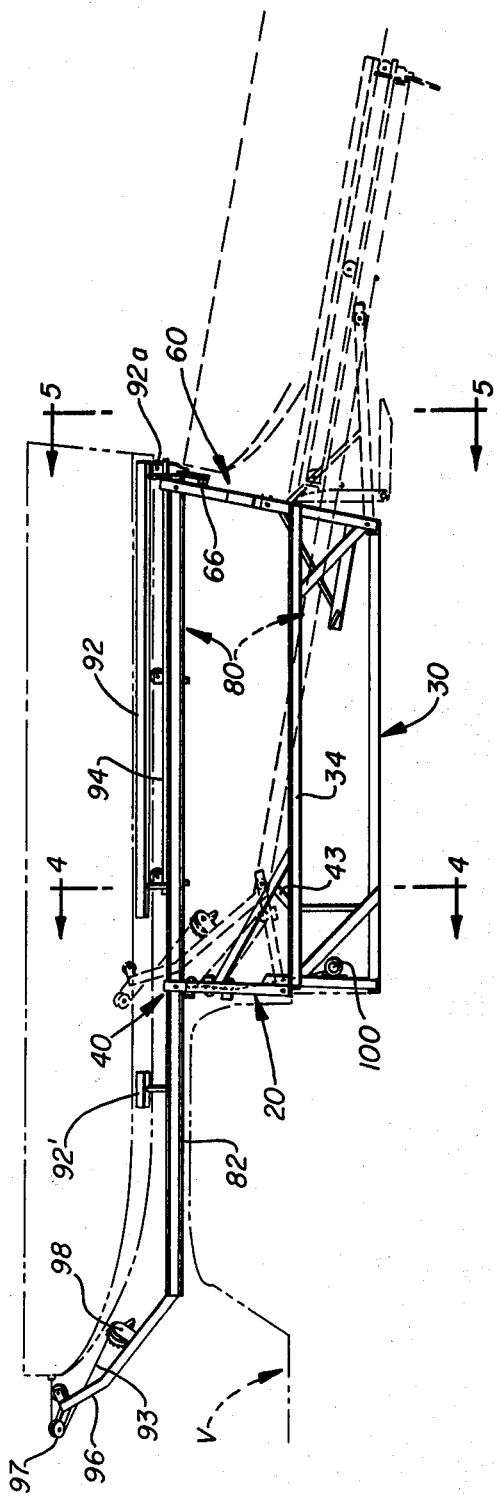
FIG. 3 is a side elevational view of invention with the carriage and elevating apparatus shown in greater detail.
Figure 7:
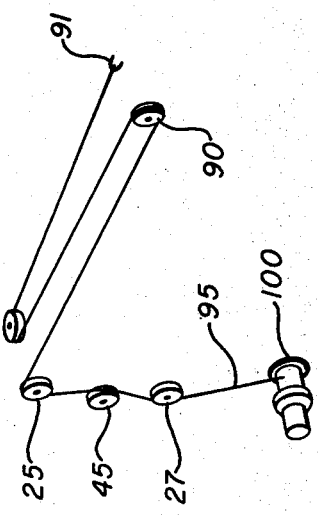
FIG. 7 is a perspective view of a winch and pulley system used in moving the carriage from the inclined to the elevated position.

The operation of the apparatus hereinbefore described is as follows:

For loading a boat which is floating in water, the pick-up is backed to the water's edge and carriage 80 is lowered to the position illustrated in FIG. 2. The hook on the end of loading line 93 is attached to an eye in the bow of a boat and winch 98 is manipulated for drawing the boat between bolsters 92 over rollers 92a onto the carriage 80.

When the electric motor on winch 100 is energized lifting line 95 is drawn taut. Initially, retraction of lifting line 95 applies force through the bight portion of line 95 to exert force on pulley 45 for rotating the link frame 40 about pivot pins 50 from a substantially horizontal position in engagement with stops 43 to a substantially vertical position in engagement with brace members 26 and 28 on support frame 20. As the link frame 40 moves to the vertical position, the front end of carriage 80 is elevated thereby changing the angle of inclination of carriage 80 from about 15° relative to a horizontal plane to an angle of inclination of about 30° relative to a horizontal plane. The carriage 80 is then moved upwardly to the elevated position which places its center of gravity above the vehicle V and between the wheels of the vehicle and substantially aligned with the drive shaft so as to aid in stabilizing the load when the vehicle is moving.

When forward movement of link frame 40 is terminated upon engagement of the support frame 20 carriage 80 moves along rollers 54 and 74 until rollers 74 on the rear post frame 60 engage the stop 87 at the rear end of track 85. Force transmitted through lifting line 95 to carriage 80 and through stop 87 to the rear post frame 60 imparts rotational movement of the rear post frame 60 about pivot pins 70 thereby rotating the rear post frame 60 to a substantially vertical position. Locking pins 21 are positioned through aligned apertures in stanchions 22 and 24 and link members 42 and 44 for locking the link frame 40 in an elevated position. Locking pins 61 are positioned through aligned apertures in post 62 and 64 and in uprights 36.

To launch a boat from the vehicle mounted carriage and elevating apparatus 10, the tailgate of the vehicle is lowered to gain access to locking pin 61. After locking pins 21 and 61 have been removed the electric winch 100 is started to pay out line 95. As line 95 becomes slack the rear post frame 60 will rotate about pivot pin 70 until the stop 76 on arm 78 engages uprights 36. When rotation of post frame 60 is terminated, carriage 80 will move by force of gravity over rollers 54 and 74 until the rear end of carriage 80 is positioned in an inclined position at an angle of approximately 30° relative to a horizontal plane and wherein the rear end of carriage 80 extends rearwardly of the vehicle V about five (5) feet.

When carriage 80 reaches its lowermost position, line 95 becomes slack allowing rotation of link frame 40 about pivot pins 50 until link members 42 and 44 engage stops 43 on the lower portion 30 of the support frame 20.

As the link frame 40 rotates about pivot pins 50 the front end of the carriage is lowered as the carriage rotates about rollers 74 on the rear post frame 60 to move the carriage to an angle of approximately 15° relative to a horizontal frame. Winch 98 is then released to dispense loading cable 93 to allow the boat to slide down carriage 80 over rollers 92a and bolsters 92.

From the foregoing it should be readily apparent that the preferred embodiment accomplishes the object of the invention hereinbefore discussed. However, other and further embodiments of the invention may be devised without departing from the basic concept thereof.

Having described my invention I claim:

1. A method of loading a boat onto a vehicle comprising the steps of: moving the boat onto a carriage while the carriage is in an inclined position extending rearwardly of the vehicle; elevating the front end of the carriage to increase the angle of inclination of the carriage relative to a horizontal plane, which includes rotating a link, having a lower end pivotally secured to the vehicle and an upper end movably secured to the carriage, from a horizontal position to a vertical position; and elevating the rear end of the carriage to position the carriage and the boat secured thereto above the vehicle, which includes rotating a post, having a lower end pivotally secured to a vehicle and an upper end movably secured to the carriage, from a horizontal position to a vertical position; and holding the link in the vertical position while moving the carriage in a horizontal direction relative to the upper end of the link.

2. The method of claim 1 with the addition of the step of: maintaining the post stationary while the link is rotating from a horizontal position to a vertical position.

3. A vehicle mounted carriage and elevating apparatus comprising: a support frame secured to the vehicle; a link frame pivotally secured to said support frame, said link frame comprising a pair of spaced link members; connector means extending between said link members; said support frame comprising a pair of spaced stanchions secured to the vehicle; brace means extending between said stanchions; pivot means securing the lower end of said link frame to said stanchions; a post frame pivotally secured to the vehicle, said post frame comprising a pair of spaced posts; stop means to limit movement of said posts through an angle of approximately 90°; a carriage, said carriage comprising a pair of spaced tracks; load support means secured between said tracks; means movably securing said carriage to said post frame; means movably securing said carriage to said link frame, said means movably securing said carriage to said post frame and said means movably securing said carriage to said link frame, each comprising a pair of rollers secured to each of said frames in engagement with said track; and actuating means secured between said support frame and said carriage, said actuating means being adapted to move said carriage from a lower inclined position extending rearwardly of the vehicle to a substantially horizontal elevated position wherein the center of gravity of the carriage is positioned above the vehicle and between the wheels of the vehicle.

4. A vehicle mounted carriage and elevating apparatus according to claim 3, said stanchions having spaced apertures formed therein; and said pivot means comprising pivot pins on said link frame positionable in said apertures.

5. A vehicle mounted carriage and elevating apparatus according to claim 3, said actuating means comprising: a winch; a flexible line having a running end secured to said winch and a dead end secured to said carriage; a pair of pulleys secured to said support frame; a pulley secured to said link frame, said line having a bight portion extending between the pulleys secured to the support frame, said bight portion of the line engaging the pulley secured to the link frames such that tensioning the line applies force through said bight portion of the line to pivot said link frame relative to said support frame.

* * * * *